(12) United States Patent
Kato et al.

(10) Patent No.: US 10,500,899 B2
(45) Date of Patent: Dec. 10, 2019

(54) AIRCRAFT PNEUMATIC TIRE

(71) Applicant: BRIDGESTONE CORPORATION, Chuo-ku, Tokyo (JP)

(72) Inventors: Kenshirou Kato, Tokyo (JP); Takeshi Takanami, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 249 days.

(21) Appl. No.: 14/786,988

(22) PCT Filed: May 2, 2014

(86) PCT No.: PCT/JP2014/062196
§ 371 (c)(1),
(2) Date: Oct. 26, 2015

(87) PCT Pub. No.: WO2014/196300
PCT Pub. Date: Dec. 11, 2014

(65) Prior Publication Data
US 2016/0068019 A1    Mar. 10, 2016

(30) Foreign Application Priority Data
Jun. 4, 2013 (JP) .................................. 2013-118232

(51) Int. Cl.
*B60C 9/20* (2006.01)
*B60C 9/22* (2006.01)
(Continued)

(52) U.S. Cl.
CPC ................ *B60C 9/20* (2013.01); *B29D 30/22* (2013.01); *B29D 30/3035* (2013.01);
(Continued)

(58) Field of Classification Search
CPC .............. B60C 9/18; B60C 2009/2074; B60C 2009/208; B60C 2009/2252;
(Continued)

(56) References Cited

U.S. PATENT DOCUMENTS

2013/0276949 A1   10/2013 Yano

FOREIGN PATENT DOCUMENTS

EP       0287496 A2    10/1988
EP       2977228 A1     1/2016
(Continued)

*Primary Examiner* — Justin R Fischer
(74) *Attorney, Agent, or Firm* — Solaris Intellectual Property Group, PLLC

(57) ABSTRACT

An object is to improve durability without increasing the tire mass.
An aircraft pneumatic tire (10) includes: a carcass ply (12) that straddles between a pair of bead portions (24); an inside belt layer (14) that is provided at a tire radial direction outer side of a crown portion of the carcass ply (12); an outside belt layer (16) that is provided at the tire radial direction outer side of the inside belt layer (14) and that is configured by a cord of cord configuration elements that have been twisted together; a belt protection layer (18) that is provided at the tire radial direction outer side of the outside belt layer (16) and that is configured by a cord of cord configuration elements that have been twisted together; and a low elasticity portion that is provided at at least one of the cord of the belt protection layer (18) or the cord of the outside belt layer (16), and that has a lower elasticity than other length direction portions of the cord (32).

4 Claims, 11 Drawing Sheets

(51) Int. Cl.
  *D02G 3/48* (2006.01)
  *B60C 9/00* (2006.01)
  *B29D 30/22* (2006.01)
  *B29D 30/30* (2006.01)
  *B29D 30/44* (2006.01)

(52) U.S. Cl.
  CPC ............ *B29D 30/44* (2013.01); *B60C 9/0007* (2013.01); *B60C 9/0042* (2013.01); *B60C 9/22* (2013.01); *D02G 3/48* (2013.01); *B60C 2009/0071* (2013.01); *B60C 2009/208* (2013.01); *B60C 2009/2096* (2013.01); *B60C 2009/2228* (2013.01); *B60C 2009/2261* (2013.01); *B60C 2009/2285* (2013.01); *B60C 2200/02* (2013.01)

(58) Field of Classification Search
  CPC .... B60C 2009/2261; B60C 2009/0071; B60C 2009/0078
  See application file for complete search history.

(56) References Cited

FOREIGN PATENT DOCUMENTS

| | | |
|---|---|---|
| EP | 2990222 A1 | 3/2016 |
| JP | H06-191219 A | 7/1994 |
| JP | 2005-343368 A | 12/2005 |
| JP | 2008-285785 * | 11/2008 |
| JP | 2012-153310 A | 8/2012 |
| WO | 2014/182265 A1 | 11/2014 |

\* cited by examiner

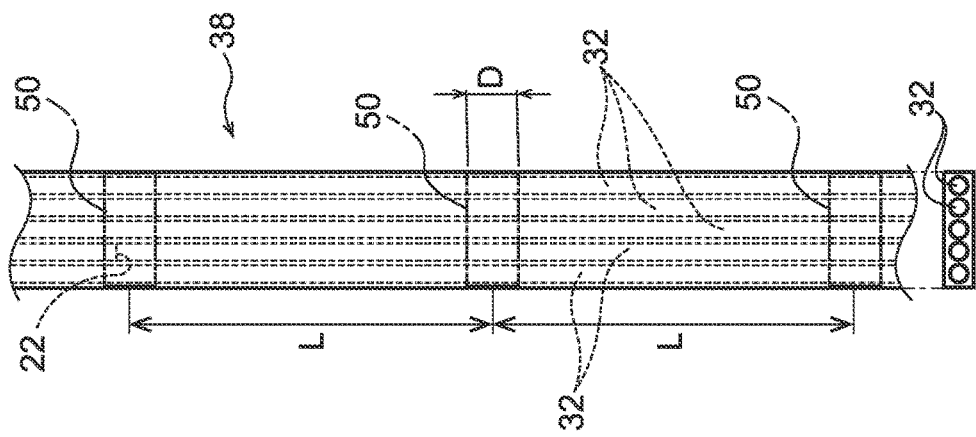
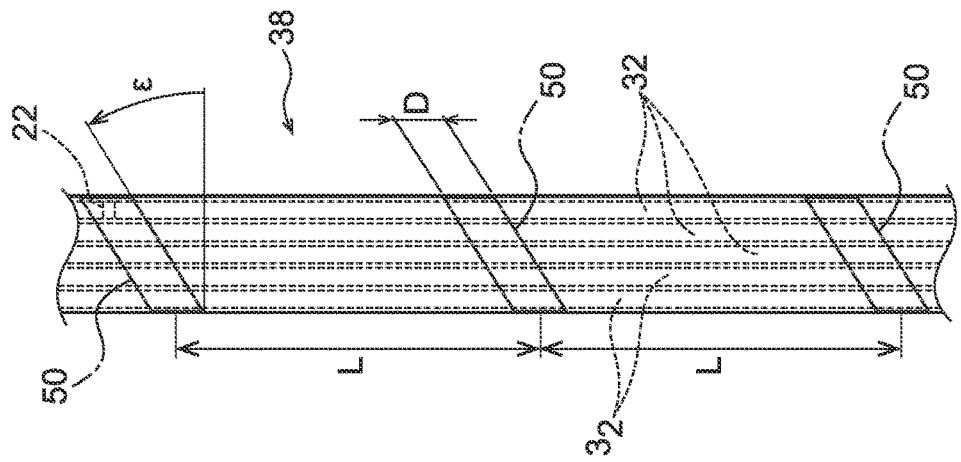

FIG.12

| | Form of belt protection layer P | Form of outer layer belt layer B1 | Piercing | | | | Cut test (number of abnormal locations) |
|---|---|---|---|---|---|---|---|
| | | | Applied to | (Tbo-Tbp)/Tbo | L/LL | D/L | |
| Example 1 | 1 waveform layer H | 2 ribbon wound layers S | P | 0.10 to 0.15 | 0.32 | 0.1 | 0 |
| Example 2 | 1 waveform layer H | 2 ribbon wound layers S | P | 0.10 to 0.15 | 0.32 | 0 | 1 |
| Example 3 | 1 waveform layer H | 2 ribbon wound layers S | P(*1) | 0.10 to 0.15 | 0.32 | 0.1 | 0 |
| Example 4 | 1 waveform layer H | 2 ribbon wound layers S | P | 0.10 to 0.15 | 0.4 | 0.1 | 0 |
| Example 5 | 1 waveform layer H | 2 split layers S | P, B1(*2) | 0.05 to 0.10 | 0.4 | 0.1 | 0 |
| Example 6 | 1 waveform layer H | 2 ribbon wound layers S | P(*3) | 0.10 to 0.15 | 0.32 | 0.1 | 0 |
| Example 7 | 1 waveform layer H | 2 ribbon wound layers S | P, B1 | 0.10 to 0.15 | 0.32 | 0.1 | 0 |
| Example 8 | 2 split layers H | 2 ribbon wound layers S | P(*4) | 0.10 to 0.15 | 0.32 | 0.1 | 0 |
| Comparative example | 1 waveform layer H | 2 ribbon wound layers S | P | 0.10 to 0.15 | 0.2 | 0.1 | 12 |
| Conventional example | 1 waveform layer H | 2 ribbon wound layers S | - | 0 | - | - | 0 |

RIBBON WOUND: RIBBON WOUND BELT CONFIGURATION
SPLIT: SPLIT BELT PLY CONFIGURATION
H: AROMATIC POLYAMIDE FIBERS
S: ALIPHATIC POLYAMIDE FIBERS
P: BELT PROTECTION LAYER
B1: OUTSIDE BELT LAYER
L: INTERVAL BETWEEN LOW ELASTICITY REGIONS AROUND TIRE CIRCUMFERENTIAL DIRECTION
LL: GROUND CONTACT LENGTH
D: STRIP WIDTH OF LOW ELASTICITY REGION
*1: OBLIQUE LOW ELASTICITY REGION (PIERCING) ($\beta = 30°$)
*2: OBLIQUE LOW ELASTICITY REGION (PIERCING) OF OUTSIDE BELT LAYER ($\beta = 30°$, $\gamma = 30°$)
*3: DISPOSED IN LOW ELASTICITY REGION (PIERCING) IN STAGGERED PATTERN (w1 = WW/3) (Fig. 5C)
*4: PIERCING ALSO PERFORMED ON TREAD RUBBER

AIRCRAFT PNEUMATIC TIRE

TECHNICAL FIELD

The present invention relates to an aircraft pneumatic tire.

BACKGROUND ART

Japanese Patent Application Laid-Open (JP-A) No. 2012-153310 describes an aircraft pneumatic tire including a protection belt layer between tread rubber and a belt layer.

SUMMARY OF INVENTION

Technical Problem

A protection belt layer is configured with plural cords that extend in the tire circumferential direction arrayed in the tire width direction, and the cords are coated in rubber. The circumferential length of the tread increases as the diameter of the tire increases when the tire is inflated to an internal pressure, and the cords of the protection belt layer are stretched. In order to suppress any increase in tension in the cords when this occurs, each of the cords is formed in a wave shape with an amplitude in the tire width direction, thereby securing room for elongation in advance.

However, there is a need to make the amplitude in the tire width direction of the cords larger in order to secure more room for elongation of the cords in aircraft pneumatic tires that have a large increase in diametric length during inflating to an internal pressure, with this creating a concern that adjacent cords will interfere with each other and that mass will increase.

In consideration of the above circumstances, an object of the present invention is to improve durability without increasing tire mass.

Solution to Problem

An aircraft pneumatic tire according to a first aspect of the present invention includes: a carcass ply that straddles between a pair of bead portions; an inside belt layer that is provided at a tire radial direction outer side of a crown portion of the carcass ply; an outside belt layer that is provided at a tire radial direction outer side of the inside belt layer and that is configured by a cord of cord configuration elements that have been twisted together; a belt protection layer that is provided at a tire radial direction outer side of the outside belt layer and that is configured by a cord of cord configuration elements that have been twisted together; and a low elasticity portion that is provided at at least one of the cord of the belt protection layer or the cord of the outside belt layer, and that has a lower elasticity than other length direction portions of the cord.

In the above aircraft pneumatic tire, the low elasticity portion is provided at at least one of the cord of the belt protection layer or the cord of the outside belt layer, and the cord is locally more liable to deform. Stress occurring at a boundary layer between the cord and rubber when the diameter is increased due to inflating to an internal pressure or during ground contact is thereby alleviated. There is no need to increase the amount of cord employed in order to secure room for elongation of the cord, thereby enabling the durability to be improved without increasing the tire mass.

A second aspect of the present invention is the aircraft pneumatic tire according to the first aspect, wherein the position of the low elasticity portion in a cord length direction differs in adjacent cords.

In the above aircraft pneumatic tire, the position of the low elasticity portion in the cord length direction differs in adjacent cords, thereby enabling stress occurring in the boundary layer between the cord and the rubber to be distributed.

A third aspect of the present invention is the aircraft pneumatic tire according to the first aspect or the second aspect, wherein at least one of the belt protection layer or the outside belt layer is provided with a low elasticity region at which the low elasticity portions are concentrated, and plural of the low elasticity regions are provided at intervals in a tire circumferential direction.

In the above aircraft pneumatic tire, the low elasticity portions are concentrated in the plural low elasticity regions provided at intervals in the tire circumferential direction, such that, when a protrusion on the pavement is run over, there is a lower probability of the protrusion being aligned with the positions of the low elasticity portions. This enables damage to the tire by the protrusion to be suppressed.

A fourth aspect of the present invention is the aircraft pneumatic tire according to the third aspect, wherein the low elasticity region is formed in a belt shape and extends continuously or intermittently in parallel to a tire width direction, or in a direction oblique to the tire width direction.

The above aircraft pneumatic tire enables stress occurring in the boundary layer between the cord and the rubber during ground contact to be distributed in a direction extending along the low elasticity region.

A fifth aspect of the present invention is the aircraft pneumatic tire according to any one of the first aspect to the fourth aspect, wherein the low elasticity portion is configured by forming a hole along a diameter direction of the cord.

The above aircraft pneumatic tire enables the low elasticity portion to be easily provided at a desired position of the cord by forming the hole in the cord.

A sixth aspect of the present invention is the aircraft pneumatic tire according to the fifth aspect, wherein the size of the hole is less than the diameter of the cord.

In the above aircraft pneumatic tire, the size of the hole is less than the diameter of the cord, thereby suppressing severing of the cord configuration elements, and enabling the breaking strength of the cord to be secured.

A seventh aspect of the present invention is the aircraft pneumatic tire according to the fifth aspect or the sixth aspect, wherein the size of the hole is half the diameter of the cord configuration elements, or greater.

In the above aircraft pneumatic tire, the size of the hole is half the diameter of the cord configuration elements, or greater, thereby enabling the elasticity of the cord configuration elements to be reduced as appropriate.

Advantageous Effects of Invention

The aircraft pneumatic tire according to the present invention obtains an excellent advantageous effect of enabling durability to be improved without increasing the tire mass.

BRIEF DESCRIPTION OF DRAWINGS

FIG. 4A is an development view illustrating an example in which a low elasticity region of a long narrow body extends continuously in parallel to the width direction of the long narrow body.

FIG. 4B is an development view illustrating an example in which a low elasticity region of a long narrow body extends continuously in a direction oblique to the width direction of the long narrow body.

FIG. 12 is a table illustrating conditions and results of test examples.

DESCRIPTION OF EMBODIMENTS

Figure 1:
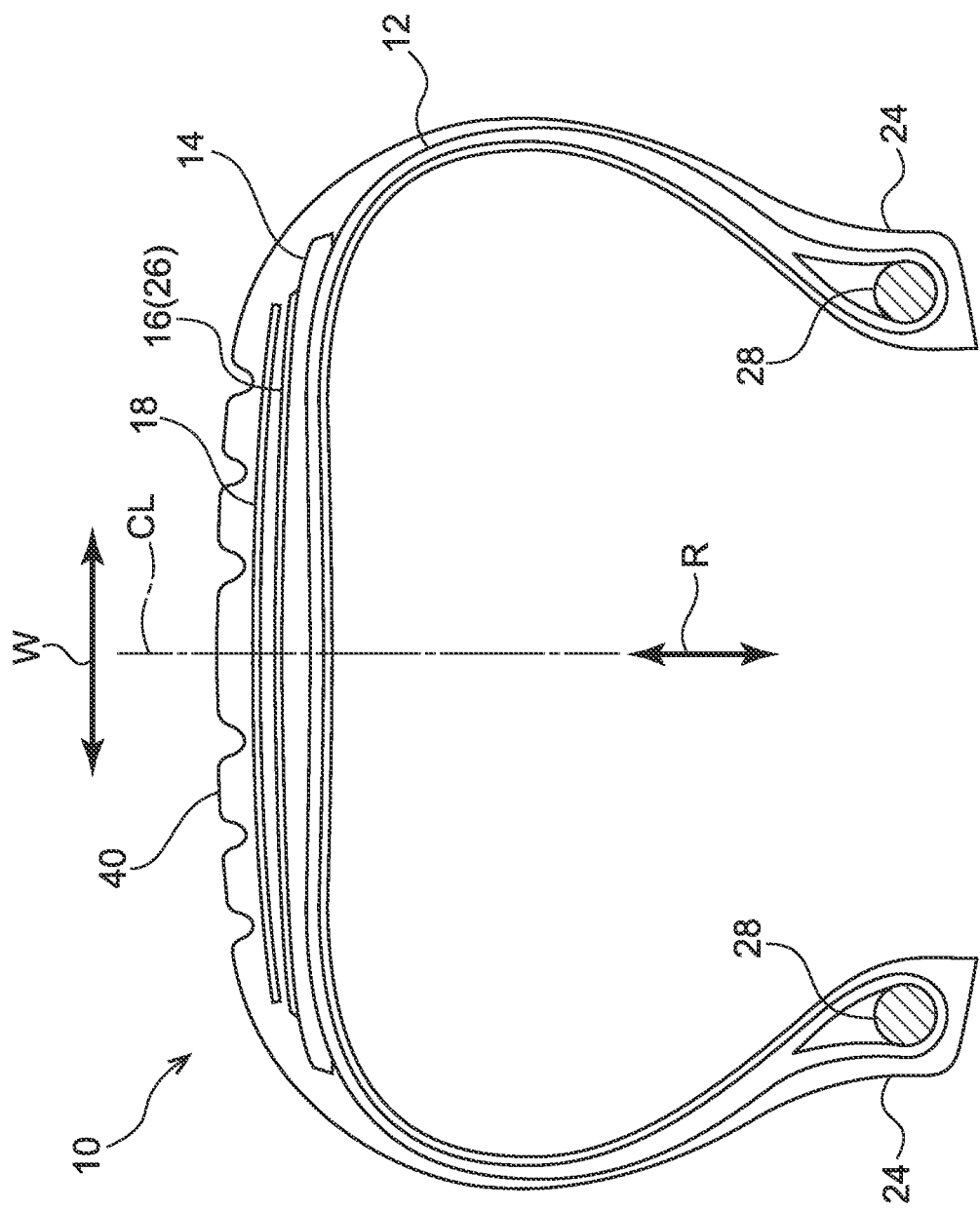
FIG. 1 is a cross-section illustrating an aircraft pneumatic tire sectioned along the tire axial direction.

Explanation follows regarding embodiments for implementing the present invention, with reference to the drawings. In the drawings, the arrow C direction indicates the tire circumferential direction, the arrow R direction indicates the tire radial direction, and the arrow W direction indicates the tire width direction. The tire radial direction means a direction orthogonal to the tire rotation axis (not illustrated in the drawings). The tire width direction means a direction parallel to the tire rotation axis. References to the tire width direction may be interchanged with the tire axial direction.

In FIG. 1, an aircraft pneumatic tire 10 according to an exemplary embodiment includes a carcass ply 12, an inside belt layer 14, an outside belt layer 16, a belt protection layer 18, and low elasticity portions 22 provided at at least one of cords 32 of the belt protection layer 18, or cords 32 of the outside belt layer 16, (FIG. 2A, FIG. 2B, FIG. 3, FIG. 5A, FIG. 5B, and FIG. 5C).

The carcass ply 12 straddles between a pair of bead portions 24. A bead core 28 with a circular shaped cross-section is embedded in each bead portion 24. Both tire width direction end portions of the carcass ply 12 are anchored to the respective bead cores 28. The carcass ply 12 is configured by coating organic fiber cords with rubber, for example. Aromatic polyamide-based fibers or aliphatic polyamide-based fibers may be employed as the organic fiber cord, or what is referred to as a hybrid cord containing aromatic polyamide-based fibers and aliphatic polyamide-based fibers may be employed.

The inside belt layer 14 is provided at the tire radial direction outer side of a crown portion of the carcass ply 12. The inside belt layer 14 is configured of plural belt plies (not illustrated in the drawings). Each belt ply is formed by coating plural organic fiber cords (not illustrated in the drawings) with rubber, for example. The organic fiber cord preferably has a tensile breaking strength of 6.3 cN/dtex or above, and preferably has an elongation ratio of 0.2% to 2.0% under a load of 0.3 cN/dtex in the stretched direction, an elongation ratio of 1.5% to 7.0% under a load of 2.1 cN/dtex in the stretched direction, and an elongation ratio of 2.2% to 9.3% under a load of 3.2 cN/dtex in the stretched direction. The organic fiber cord may be configured of aromatic polyamide-based fibers.

Figure 2A:
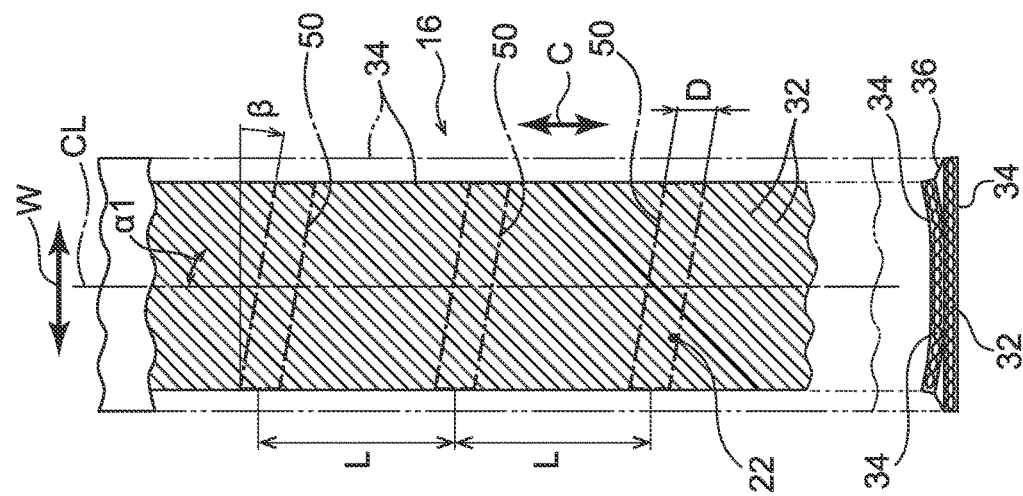
FIG. 2A is an development view and a cross-section illustrating a belt ply at the outside of an outside belt layer configured as a split belt ply.
Figure 2B:
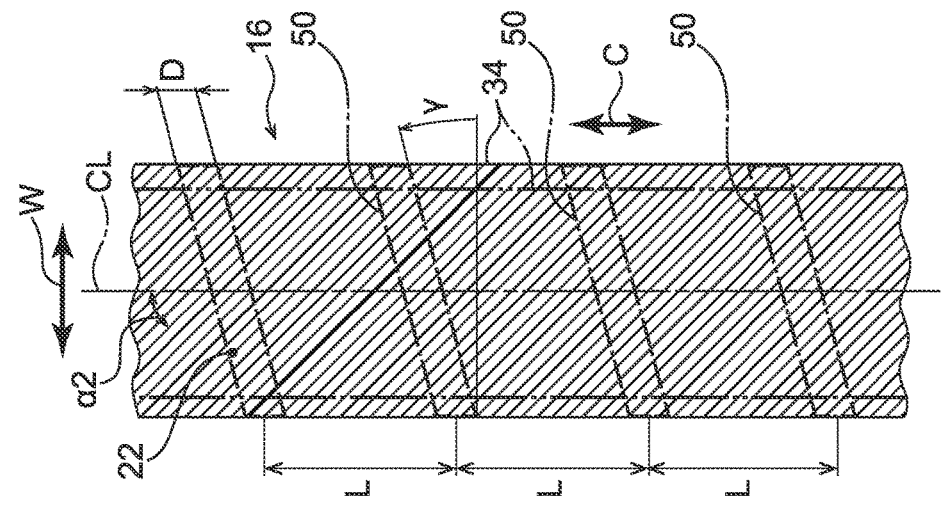
FIG. 2B is an development view illustrating a belt ply at the inside.
Figure 6:
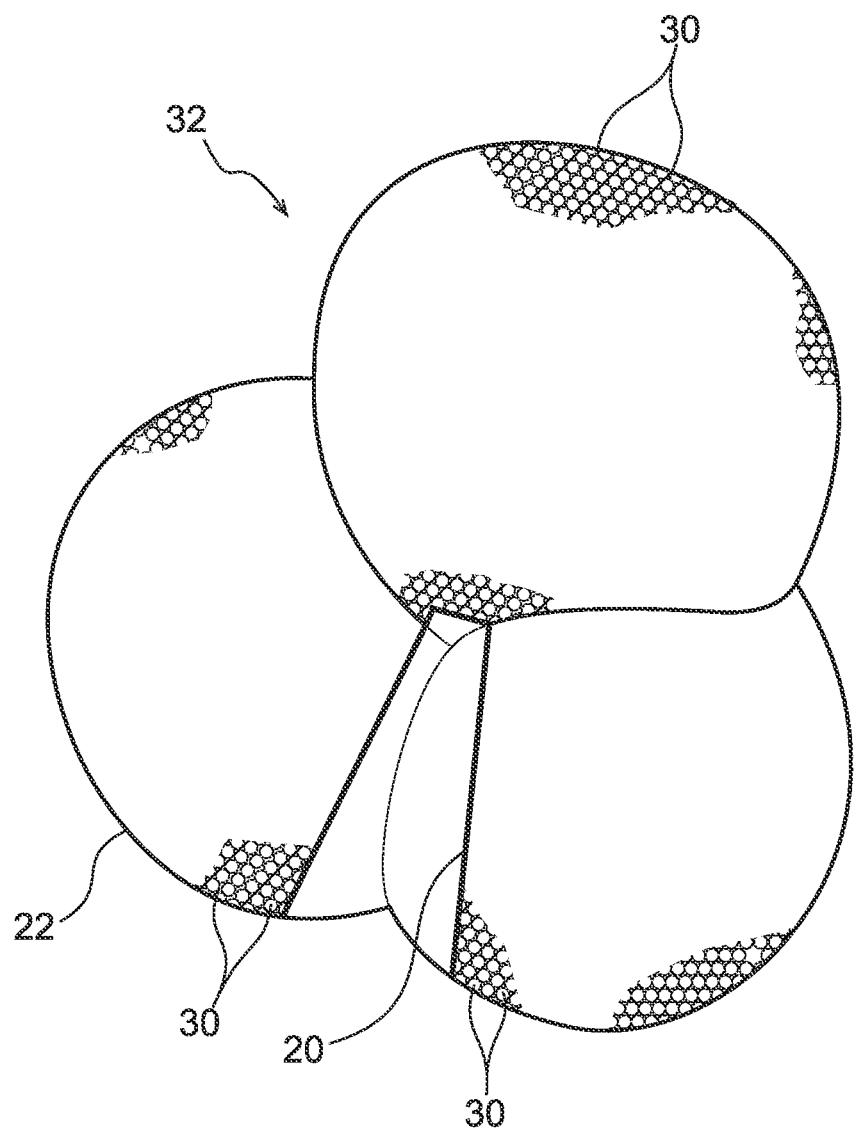
FIG. 6 is a cross-section illustrating an example in which a hole serving as a low elasticity portion is formed in a cord that has organic fibers as cord configuration elements.
Figure 7:
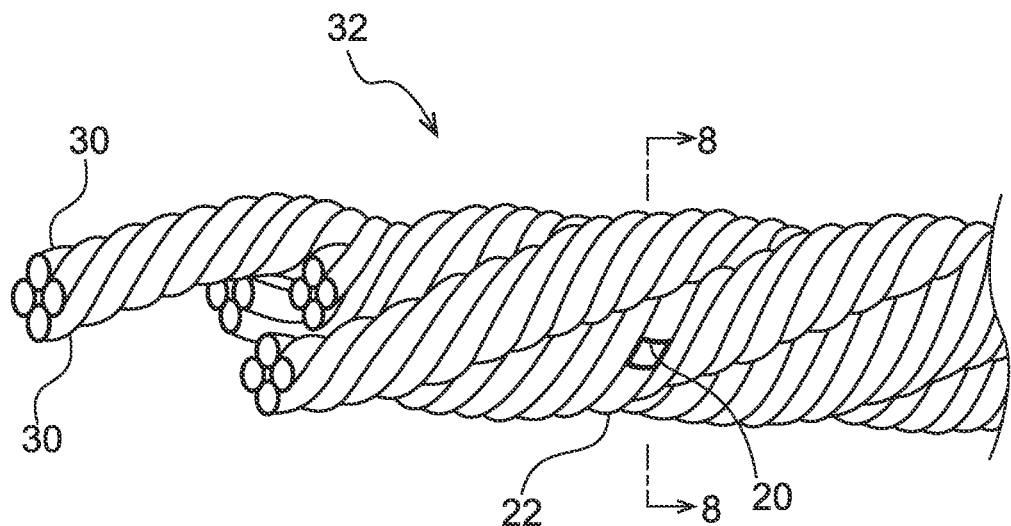
FIG. 7 is a perspective view illustrating an example in which a hole serving as a low elasticity portion is formed in a cord that has metal fibers as cord configuration elements.
Figure 8:
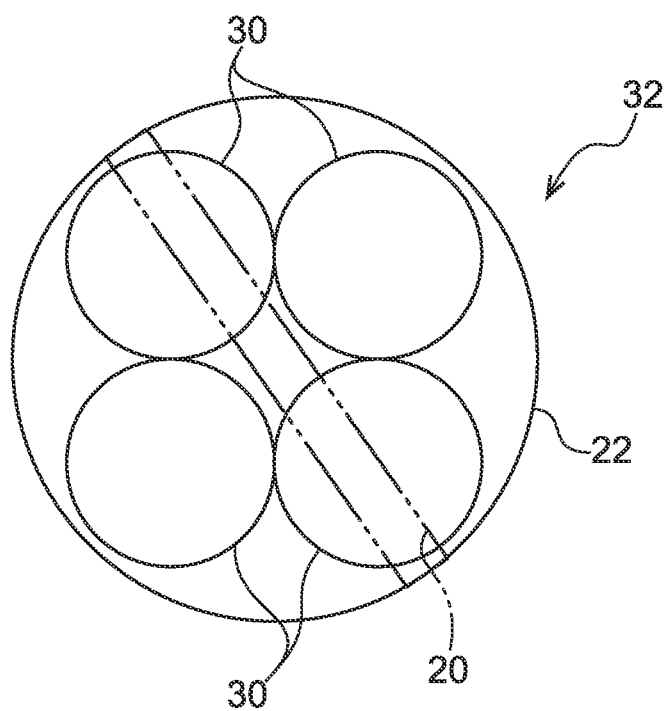
FIG. 8 is an enlarged cross-section taken along arrows 8-8 in FIG. 7.

In FIG. 2A and FIG. 2B, the outside belt layer 16 is provided at the tire radial direction outer side of the inside belt layer 14, and is configured using the cords 32 of cord configuration elements 30 that have been twisted together (see FIG. 6 to FIG. 8). Each cord 32 is an organic fiber cord, for example, and a unidirectional reinforced fiber cord with a tensile breaking strength of 400N to 2000N is employed. An aromatic polyamide, or an aliphatic polyamide, for example, may be employed as the unidirectional reinforced fiber cord. The cord configuration elements 30 are explained later.

A single belt ply 34 is configured by rubber coating the cords 32. The outside belt layer 16 is configured by layering plural belt plies 34 (the configuration of the outside belt layer 16 is referred to below as a "split belt ply configuration"). As illustrated in FIG. 2B, the present exemplary embodiment is configured by layering two belt plies 34.

In each belt ply 34, plural cords 32 are arrayed so as to form oblique angles $\alpha 1$, $\alpha 2$ with respect to a tire equatorial plane CL. The oblique angle of the outside belt ply illustrated in FIG. 2A is $\alpha 1$, and the oblique angle of the inside belt ply illustrated in FIG. 2B is $\alpha 2$. The oblique angles $\alpha 1$, $\alpha 2$ are within a range from 10° to 40°. Setting the oblique range in this manner enables the internal work by the outside belt layer 16 with respect to a protrusion on the pavement to be increased. Moreover the cords 32 of the belt plies 34 that are adjacent to each other in the tire radial direction are disposed so as to be oblique in opposite directions to each other with respect to the tire equatorial plane CL, namely, so as to form angles in opposite directions with respect to the tire equatorial plane CL. The oblique angles $\alpha 1$, $\alpha 2$ of the cords 32 in the outside belt layer 16 are set larger than similar oblique angles of the organic fiber cords (not illustrated in the drawings) in the inside belt layer 14.

The cord 32 is configured of an aromatic polyamide-based organic fiber cord, for example, and is preferably a twisted cord with an overall dtex number of from 3000 to 7000 per cord. The cord 32 configured in this manner enables the aircraft pneumatic tire 10 to be lightweight. Note that the number of strands of the cord 32 embedded in the outside belt layer 16 is preferably within a range of 3 to 8 strands/10 mm.

As illustrated in FIG. 2A, a cushion rubber 36 is provided between the two belt plies 34 at either tire width direction end portion of the outside belt layer 16. It is preferable that a distance between the cords 32 of the inside belt ply 34 and the cords 32 of the outside belt ply 34 gradually increases on progression toward the tire width direction outer sides. This enables shear stress between the belt plies 34 to be effectively reduced, and enables end portions of the belt plies 34 to be suppressed from delaminating.

Figure 3:
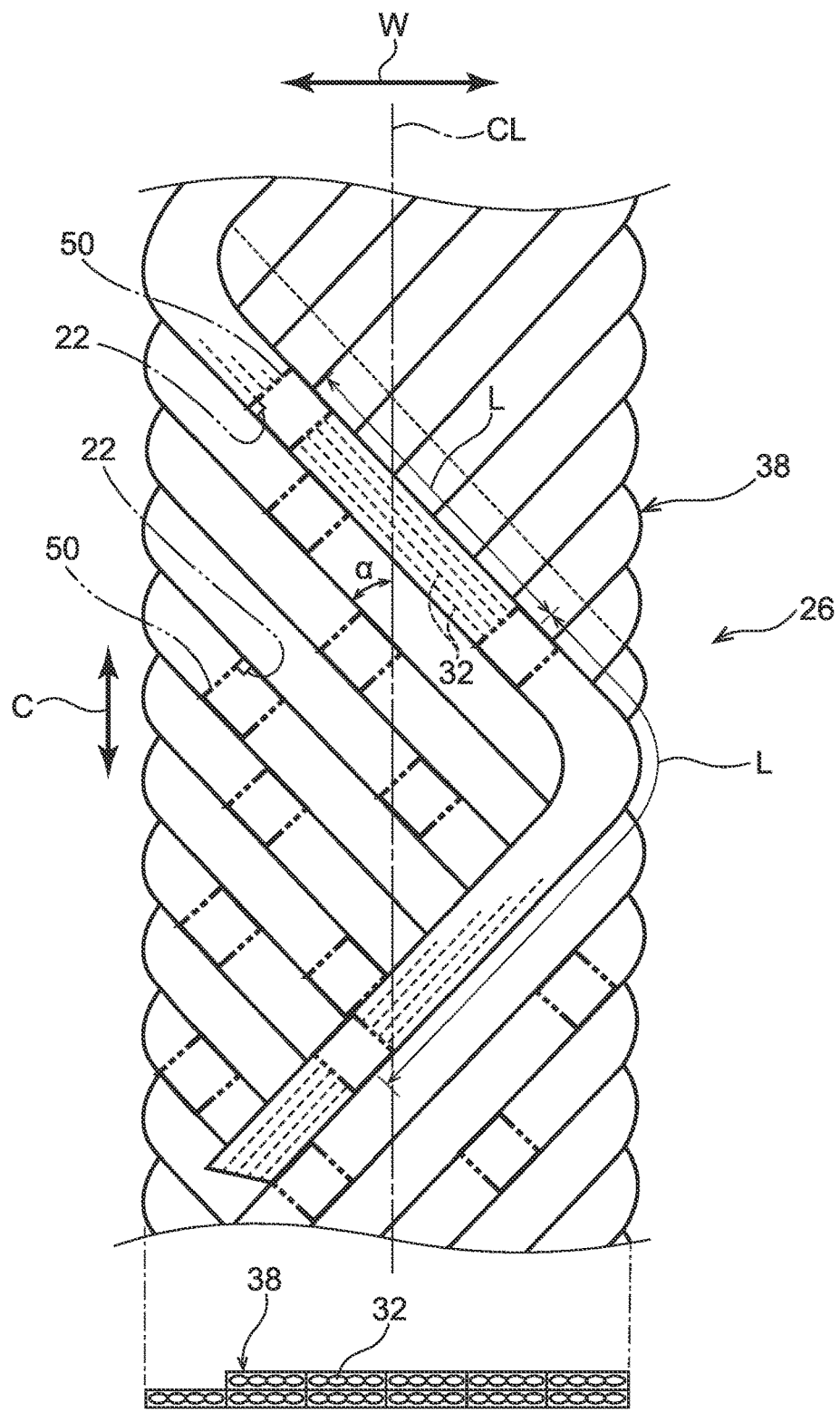
FIG. 3 is an development view illustrating an outside belt layer configured as an endless zigzag wound belt.

An outside belt layer 26, as illustrated in FIG. 3, may be employed instead of the outside belt layer 16 configured with a split belt ply. The configuration of the outside belt layer 26 is referred to below as an "endless zigzag wound belt configuration" or a "ribbon wound belt configuration". The outside belt layer 26 is formed as described below. As illustrated in FIG. 4A and FIG. 4B, first, a belt shaped long narrow body 38, configured by coating one or plural cords 32 (five in FIG. 4A and FIG. 4B) with rubber, is prepared. The long narrow body 38 is wound along the circumferential direction, obliquely at an oblique angle α with respect to the tire equatorial plane CL, while being moved to and fro between the two ply ends at substantially every cycle. Windings are wound multiple times substantially along the circumferential direction, while shifting by the width of the long narrow body 38 such that gaps do not occur between each of the long narrow bodies 38.

The outside belt layer 26 formed in this manner has a form in which cord portions sloping toward the top right and cord portions sloping toward the top left overlap with each other. In the outside belt layer 26, a belt ply formed only of the cords 32 sloping toward the top right and a belt ply formed only of the cords 32 sloping toward the top left are overlapped on each other, to form a configuration equivalent to a so-called cross belt. Although the outside belt layer 26 is actually a single ply, it is counted as two plies in the present exemplary embodiment. The oblique angle α and the strand interval of the cords 32 in this case is similar to the configuration of the split belt ply described above (FIG. 2A, FIG. 2B).

Figure 5A:
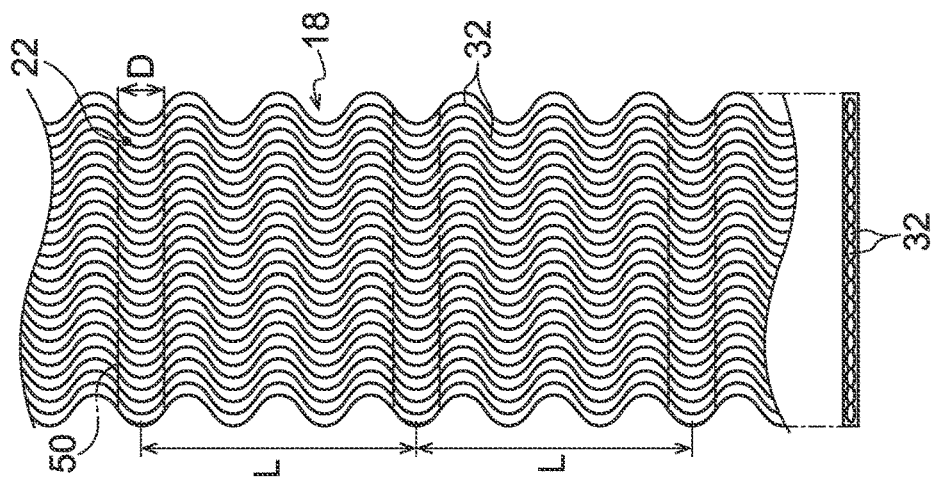
FIG. 5A is an development view illustrating an example in which a low elasticity region of a belt protection layer is formed in a belt shape, and extends continuously in parallel to the tire width direction.
Figure 5B:
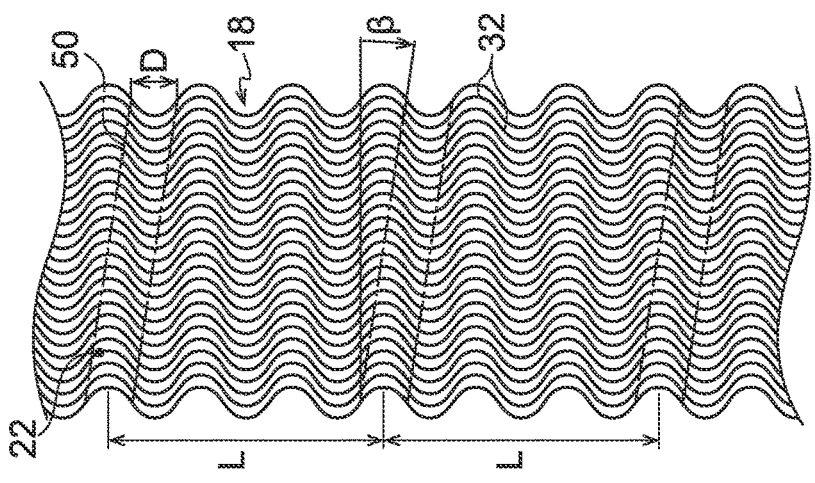
FIG. 5B is an development view illustrating an example in which a low elasticity region of a belt protection layer is formed in a belt shape, and extends continuously in a direction oblique to the tire width direction.
Figure 5C:
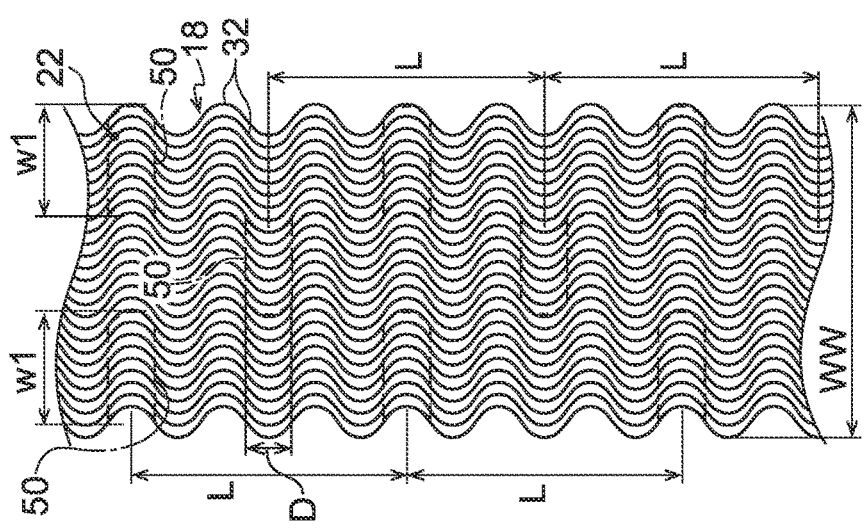
FIG. 5C is an development view illustrating an example in which a low elasticity region of a belt protection layer is formed in a belt shape, and extends intermittently in parallel to the tire width direction.

In FIG. 5A, FIG. 5B, and FIG. 5C, the belt protection layer 18 is provided at the tire radial direction outer side of the outside belt layer 16, and is configured by the cords 32 of cord configuration elements 30 that have been twisted together. The cords 32 are formed in a wave shape with amplitude along the tire width direction, and plural cords aligned in the tire width direction are coated with rubber. This is in order to secure a large room for elongation of the cords 32. A tread 40 is provided at the tire radial direction outer side of the belt protection layer 18. Forming the cords 32 in a wave shape permits large localized deformation, and enables the enveloping properties of the aircraft pneumatic tire 10 to be increased when the tread 40 runs over a protrusion.

In FIG. 6 to FIG. 8, each cord 32 is configured by twisting together the cord configuration elements 30. The cord configuration elements 30 are organic fibers or metal fibers, and the minimum configuration unit is a fibril in the case of organic fibers, or a filament in the case of metal fibers. The elastic modulus and strength of the cord 32 generally depend on the material, twist angle, and twist structure of the fibers, the length of the cord configuration elements 30, and the internal friction according to manufacturing conditions. In the case of organic fibers, the length of the fibril, this being the minimum configuration unit, is significantly shorter than the length of a long fiber cord of the twisted together fibrils. However, the elastic modulus, strength, and some of the stress-strain properties of the cord are exhibited due to friction caused by the physical intertwining of adjacent fibrils with each other.

The low elasticity portions 22 are provided at at least one of the cords 32 of the belt protection layer 18 or the cords 32 of the outside belt layer 16, and are configured with lower elasticity than other length direction portions of the cords 32. Each low elasticity portion 22 is configured by, for example, forming a hole 20 in the diameter direction of the cord 32. This forming of the hole 20 is referred to below as "piercing". FIG. 6 illustrates an example in which the hole 20 serving as the low elasticity portion 22 is formed in a cord 32 in which the cord configuration elements 30 are organic fibers. Although this hole 20 does not pierce through the cord 32, the hole 20 may pierce through the cord 32.

FIG. 7 and FIG. 8 illustrate an example in which the hole 20 serving as the low elasticity portion 22 is formed in a cord 32 in which the cord configuration elements 30 are metal fibers. FIG. 8 is an enlarged cross-section viewed along arrows 8-8 in FIG. 7. The size of the hole 20 is, for example, less than the diameter of the cord 32. As illustrated in FIG. 7 and FIG. 8, in cases in which the cord configuration elements 30 are metal fiber filaments, the size of the hole 20 is half the diameter of the cord configuration elements 30, or greater. Note that, in cases in which the hole 20 does not have a circular shape, the size of the hole 20 refers to the maximum distance between inner walls of the hole 20. In cases in which the hole 20 has a rectangular shape, the size of the hole 20 is the length of the long sides thereof. In cases in which the hole 20 has a square shape, the size of the hole 20 is the length of the sides thereof.

In the present exemplary embodiment, breaking or damaging an appropriate proportion of the cord configuration elements 30 using a mechanical method after molding the cord 32 allows the relationship between the tensile force and elongation of the cord 32 (S-S properties) to be controlled, and allows the elastic modulus to be reduced while more than sufficiently securing the breaking strength in particular. The present exemplary embodiment is designed to alleviate distortion at a boundary layer between the cord 32 and the rubber arising from the tread 40 running over a small protrusion.

Figure 11:
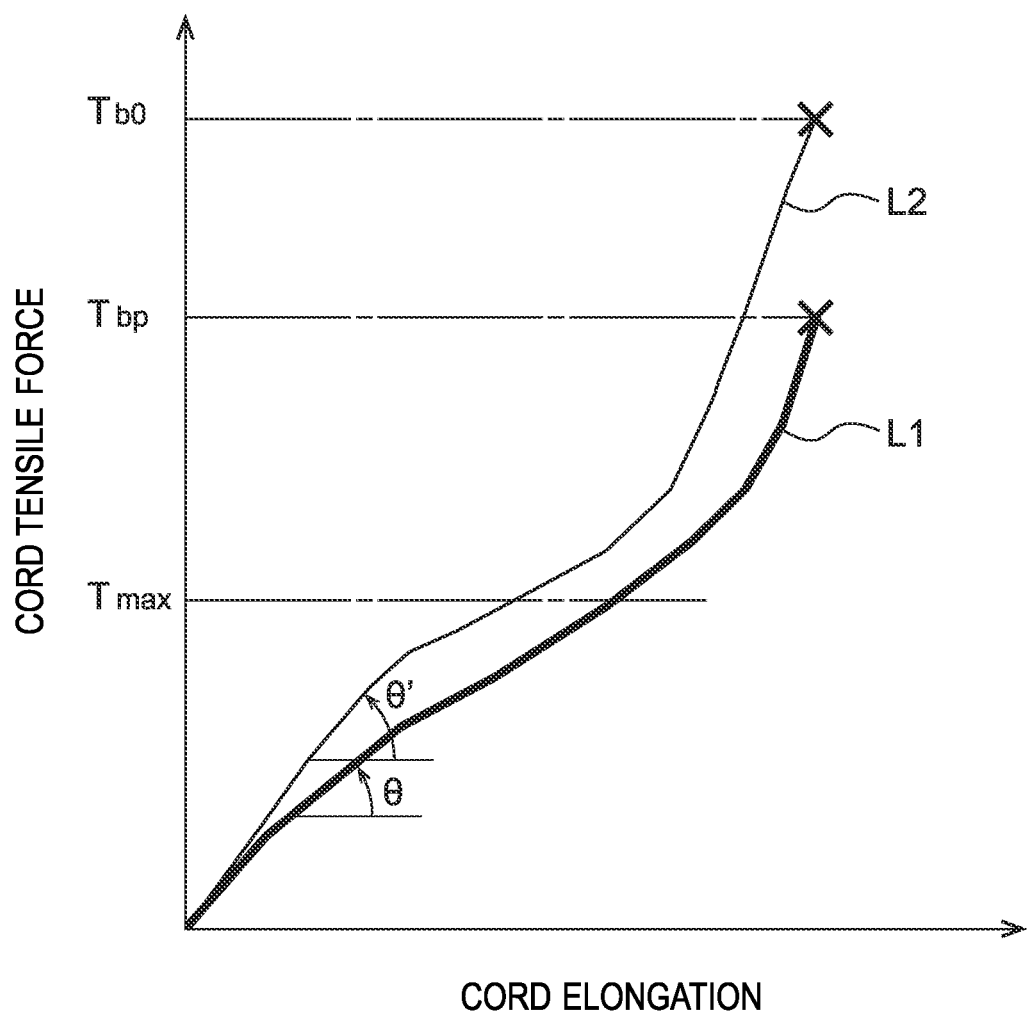
FIG. 11 is a line graph illustrating a relationship between tensile force and elongation of a cord (S-S properties).

FIG. 11 illustrates a relationship between the tensile force and elongation (S-S properties) of a cord. Line L1 indicates a case in which the cord 32 includes the low elasticity portion 22, and line L2 indicates a case in which a regular cord does not include a low elasticity portion. The tension of the cord increases due to inflating to the internal pressure envisaged during normal use, each of the loads borne in the tire radial direction, tire width direction, and the tire rotation direction, and penetration of a protrusion on the pavement into the tread 40. The maximum tension acting on the cord during actual use is referred to as Tmax. By providing the low elasticity portion 22, the breaking strength Tbp of the cord 32 (line L1) is lower than the breaking strength Tbo of the regular cord (line L2). However, the low elasticity portion 22 is designed such that the breaking strength Tbp nevertheless exceeds the maximum tension Tmax. In the case of the aircraft pneumatic tire 10, the maximum tension Tmax occurring in the outside belt layer 16 is estimated to be approximately 3 kN to 8 kN, and so it is preferable to set the breaking strength Tbp of the cord 32 (line L1) sufficiently larger than this. The angles θ, θ' in FIG. 11 can be employed to express the rate of change in elasticity as 1−tanθ/tanθ'.

Formation of Low Elasticity Portion

As illustrated in FIG. 9A to FIG. 9E, a mechanical method using a sharp needle 42 (piercing) is effective as a method of appropriately forming the low elasticity portion 22, while controlling the S-S properties of the cord configuration elements 30. The shape of a leading end portion of the needle 42 does not have a point, and preferably has a portion with a straight line or serrated shaped profile, when viewed along a diameter direction of the needle 42. In particular, in cases in which the cord configuration elements 30 are a highly flexible material such as organic fibers, if a leading end of the needle was excessively pointed, the leading end would pass between the fibrils, and an appropriate proportion of the fibrils could not be broken.

Figure 9A:
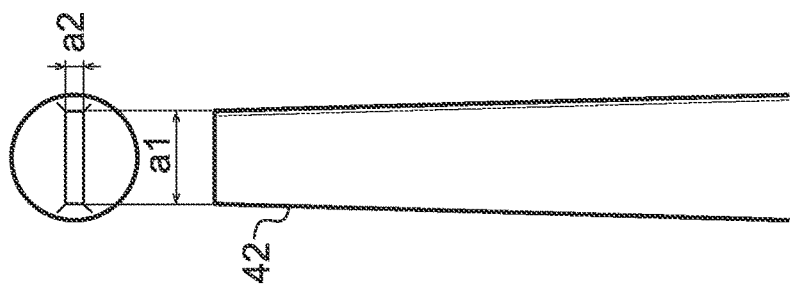
FIG. 9A is a plan view and a front view illustrating the shape of a leading end of a needle.
Figure 9B:
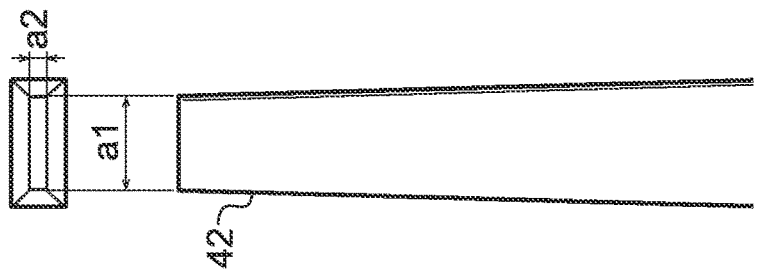
FIG. 9B is a plan view and a front view illustrating the shape of a leading end of a needle.
Figure 9C:
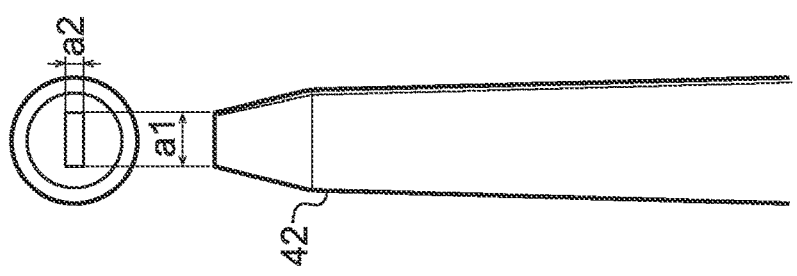
FIG. 9C is a plan view and a front view illustrating the shape of a leading end of a needle.
Figure 9D:
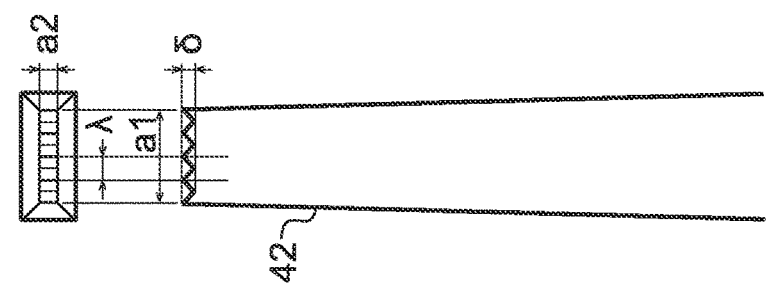
FIG. 9D is a plan view and a front view illustrating the shape of a leading end of a needle.
Figure 9E:
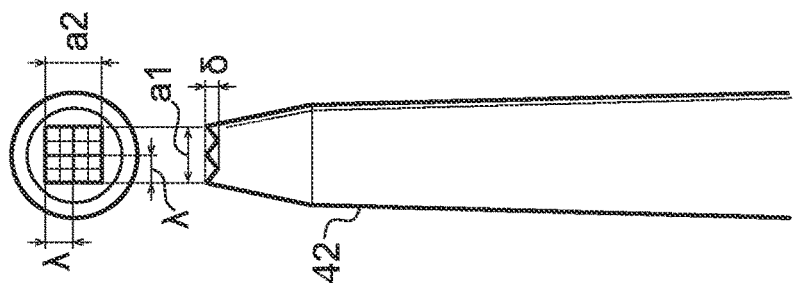
FIG. 9E is a plan view and a front view illustrating the shape of a leading end of a needle.

A shaft portion of each of the needles 42 illustrated in FIG. 9A, FIG. 9C, and FIG. 9E has a circular shaped cross-section. A shaft portion of each of the needles 42 illustrated in FIG. 9B and 9D has a rectangular shaped cross-section. The leading end portion of each of the needles 42 illustrated in FIG. 9A to FIG. 9D is formed in a rectangular shape, as viewed from the axial direction thereof. The length of the long sides is a1, and the length of the short sides is a2. The leading end of the needle 42 illustrated in FIG. 9D includes a serrated shaped (zigzag shaped) portion, as viewed in a diameter direction and a direction orthogonal to the long sides thereof. The leading end of the needle 42 illustrated in FIG. 9E is formed in a substantially square shape (a1≈a2), as viewed from the axial direction thereof. The leading end includes serrated shaped (zigzag shaped) portions, as viewed in the diameter direction and directions orthogonal to the respective sides thereof.

The leading end of the needle 42 is pressed against the cord 32 with an appropriate load, in a direction orthogonal to the cord 32, for example. In cases in which the cord configuration elements 30 are organic fibers, in order to break an appropriate proportion of the fibrils, a range of 0.1 d<a1<0.6 d, a2<a1 is set for lengths a1, a2, where d is the diameter of the cord 32. As illustrated in FIG. 9D, FIG. 9E, for the same reason, in cases in which the leading end of the needle 42 includes a serrated shaped portion, a preferable relationship between a wavelength λ, an overall amplitude δ, and a length a2 is 0.4 d<λ<2.5 d, a2<d, 0.3 d<δ<1.5 d. By setting the leading end shape of the needle 42 in this manner, under conditions in which the diameter of the cord 32 formed of organic fibers is 1.9 mm, and the pressing force of the needle 42 is 30N to 50N, a yield of 70% or more can be obtained when reducing the elasticity and breaking force of the cord 32 to 75% to 90%.

Figure 10A:
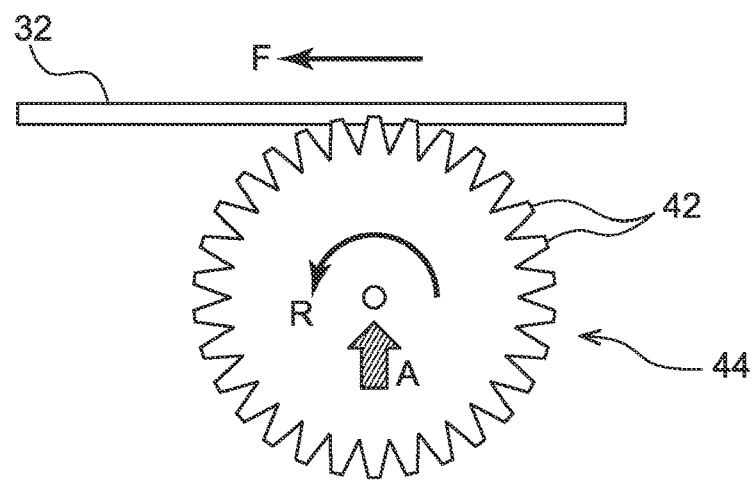
FIG. 10A is a front view illustrating a method of forming holes in a cord using rotary teeth in which plural needles are disposed in a radiating shape.
Figure 10B:
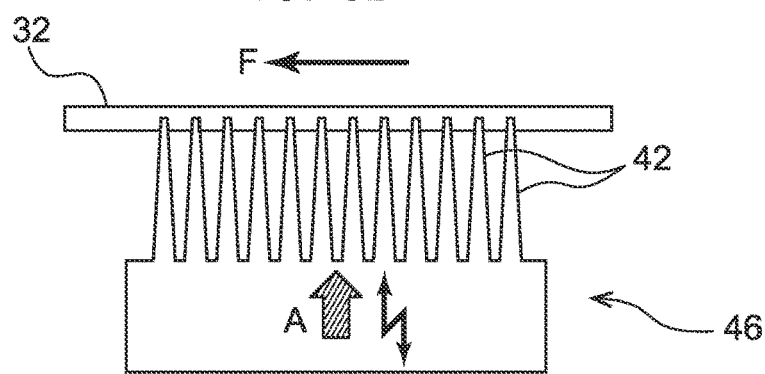
FIG. 10B is a front view illustrating a method of forming holes in a cord using a comb tooth member in which plural needles are aligned parallel to each other.
Figure 10C:
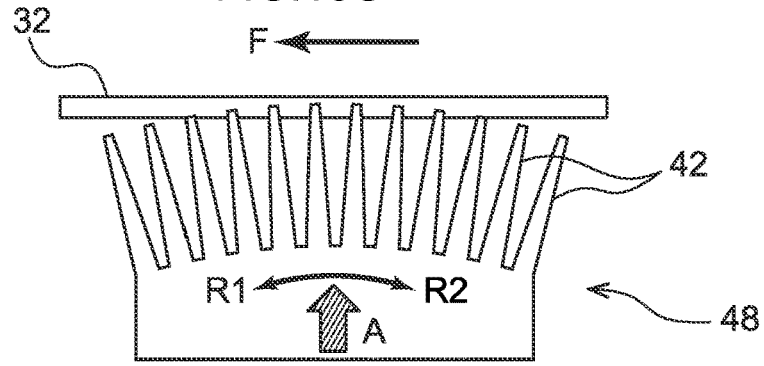
FIG. 10C is a front view illustrating a method of forming holes in a cord using a comb tooth member in which needles are aligned in a partially circular arc shape (fan shape).

The methods illustrated in FIG. 10A, FIG. 10B, and FIG. 10C are conceivable methods to efficiently perform piercing by the needle 42. In the example illustrated in FIG. 10A, rotary teeth 44 are employed in which plural needles 42 are disposed in a radiating shape. The rotary teeth 44 are rotated in the arrow R direction, and the cord 32 is conveyed in the arrow F direction, while the rotary teeth 44 are pressed against the cord 32 in a direction orthogonal to the cord 32 (the arrow A direction).

In the example illustrated in FIG. 10B, a comb tooth member 46 is employed with plural needles 42 aligned in parallel to each other. An operation is repeated in which the comb tooth member 46 is pressed against the cord 32 in the arrow A direction and then moved back in the opposite direction thereto, the cord 32 is conveyed a specific pitch along the arrow F direction, and the comb tooth member 46 is pressed against the cord 32 again. Namely, the comb tooth member 46 is moved to and fro in the arrow A direction and the opposite direction thereto, while the cord 32 is conveyed intermittently.

In the example illustrated in FIG. 10C, a comb tooth member 48 is employed in which the needles 42 are aligned in a partially circular arc shape (fan shape). The comb tooth member 48 is rotated in the arrow R1 direction and the cord 32 is conveyed in the arrow F direction, while the comb tooth member 48 is pressed against the cord 32 in the arrow A direction. After the needles 42 have been pressed once against the cord 32, the comb tooth member 48 is moved back in the opposite direction to the arrow A direction and rotated in the arrow R2 direction, the cord 32 is conveyed in the arrow F direction, and then the above operation is repeated.

The degree by which the breaking strength of the cord 32 is reduced due to providing the low elasticity portions 22 in this manner is expressed by Equation (1). In the equation, k is a coefficient that depends on the needle diameter, the leading end shape of the needle, the needle material, the cord twisting angle, the cord cross-section shape, the cord material, and the pressing pressure.

$$(Tbo-Tbp)/Tbo = (k \cdot \text{Piercing cross-section area (apparent surface area due to piercing by needle)}) / \text{Actual cross-section area of cord} \quad (1)$$

The cord tension when a protrusion of a height δ contacts the outside belt layer 16 and the belt protection layer 18 is expressed by Equation (2). In the equation, i is the belt layer number, N is the number of belts, a is the belt angle, w is the width of the protrusion, and F is the external force due to the protrusion. The tension $Tc_i$ is the maximum tension of the cord as it increases due to the conceivable inflated internal pressure and loads borne in the perpendicular, lateral, and front-rear directions during normal use, and due to the dimension and hardness of a protrusion, which has an uncontrollable possibility of being present on the pavement, penetrating through the tread. In order to secure cut resistance performance in which momentary force plays a major role, the maximum tension $Tc_i$ of each layer must not exceed the breaking force $Tb_i$.

Equation (2)

$$Tc_i = \frac{F_i p \cos\alpha_1}{2w\sin\left(\tan^{-1}\frac{\delta\cos\alpha_1}{a}\right)} \leq Tb_i \quad (2)$$

$$i = 1, \ldots N$$

$$F = \sum_{i=1}^{N} F_i$$

In consideration thereof, it is possible to appropriately provide the low elasticity portions 22 to the cords 32 employed in the outside belt layer 16 or the belt protection layer 18. The density of breaks in the cord configuration elements 30 due to providing the low elasticity portions 22 may be determined by experience, according to a combination of piercing conditions (the coefficient k in Equation (1)), such as the diameter and material of the needle 42, the number of times pierced, and the pressure applied to the member.

The failure factors of the tread 40 or the outside belt layer 16 due to a protrusion on the runway pavement are classified from A to D below.

A: Probability of the presence of a harmful protrusion
B: Cord breakage due to the protrusion penetrating the tread ($Tb_i < Tc_i$)
C: Stress concentration at a rigidity step region directly below the protrusion, namely, a boundary region between the cord and the rubber
D: Stress concentration due to alignment of the position where the protrusion acts at a position of piercing In the present exemplary embodiment, factors B to D can be eliminated. Specifically, factor B can be eliminated by designing so as to simultaneously satisfy both Equations (1) and (2). The S-S properties can easily be controlled by piercing, and, accompanying a reduction in the cord elasticity, the concentration of stress at the boundary region between the cord and the rubber is alleviated, and the anti-separation performance due to fatigue is improved. This enables the influence of factor C to be suppressed.

In the present exemplary embodiment, only part of each cord configuration element 30 is broken or damaged, such that the degree of stress concentration is originally small. Mechanical strain due to a protrusion is more easily distributed, the influence is confined to a smaller region, and the reduction in durability is kept to a minimum, compared to a method in which the entire cross-section of the cord is severed. This enables the influence of factor D to be suppressed. Moreover, manufacturing is relatively easy.

In order to further disperse stress, it is preferable that the positions of the low elasticity portions 22 in the cord length direction are different to each other in adjacent cords 32.

Low Elasticity Region

In FIG. 2A, FIG. 2B, FIG. 3, FIG. 5A, FIG. 5B, and FIG. 5C, at least one of the belt protection layer 18 or the outside belt layer 16 is provided with low elasticity regions 50 at which the low elasticity portions 22 are concentrated. In order to disperse stress, plural low elasticity regions 50 are provided with an interval L therebetween in the tire circumferential direction (arrow C direction). It is preferable that L/LL>0.3, where LL (not illustrated in the drawings) is the ground contact length of the tread 40 in the tire circumferential direction. Note that the ground contact length is a length over which the tire contacts a flat pavement along the tire equatorial plane CL, under conditions of being applied with the internal pressure stipulated by TRA, and bearing the load stipulated by TRA.

Each low elasticity region 50 includes a tire circumferential direction groove with a strip width D. The low elasticity portions 22 are provided so as to be distributed within the range of the strip width D. In other words, the positions of the low elasticity portions 22 in the cord length direction are set so as to be different to each other in adjacent cords 32 within the range of the strip width D.

When the tread 40 runs over a protrusion on the pavement, the maximum tension $Tc_i$ is most severe in cases in which the protrusion is a blade-shaped protrusion. The cut resistance performance can be secured even in such cases, by distributing the positions of the low elasticity portions 22 as described above, and by satisfying the condition that L/LL>0.3.

FIG. 2A and FIG. 2B illustrate the outside belt layer 16 with the split belt ply configuration. In each belt ply 34, the low elasticity regions 50 are oblique at an angle β with respect to the tire width direction. The oblique direction is in the opposite direction to the oblique direction of the cords 32 in each belt ply 34.

FIG. 3 illustrates the outside belt layer 26 with the endless zigzag wound belt configuration. As illustrated in FIG. 4A and FIG. 4B, in the outside belt layer 26, each low elasticity region 50 is formed in a belt shape to the long narrow body 38. The positions of the low elasticity regions 50 in the length direction of the narrow length bodies 38 are different to each other in adjacent narrow length bodies 38. In the examples illustrated in FIG. 3 and FIG. 4A, the low elasticity regions 50 extend continuously in parallel to the width direction of the long narrow body 38. In the example illustrated in FIG. 4B, the low elasticity regions 50 extend continuously in an oblique direction at an angle ε with respect to the width direction of the long narrow body 38. In both FIG. 4A and FIG. 4B, the low elasticity regions 50 extend along the length direction of the long narrow body 38.

In the belt protection layer 18 illustrated in FIG. 5A, the belt-shaped-formed low elasticity regions 50 extend continuously parallel to the tire width direction. In the belt protection layer 18 illustrated in FIG. 5B, the low elasticity regions 50 extend continuously in an oblique direction at the angle β with respect to the tire width direction. In the belt protection layer 18 illustrated in FIG. 5C, the low elasticity regions 50 are each formed in a belt shape, and extend intermittently in parallel to the tire width direction. The low elasticity regions 50 are disposed in a staggered pattern, for example. In the low elasticity region 50, w1<WW, where w1 is a dimension in the tire width direction, and WW is the entire width of the belt protection layer 18. Disposing the low elasticity regions 50 in this manner enables the cut resistance performance to be secured.

Note that the low elasticity regions 50 may extend intermittently in an oblique direction to the tire width direction. The length w1 of the low elasticity regions 50 may differ as appropriate. In FIG. 2A, FIG. 2B, FIG. 3, FIG. 5A, FIG. 5B, and FIG. 5C, the interval L and the strip width D of the low elasticity regions 50 are not limited to being constant, and may differ by location.

Effects

Explanation follows regarding the effects of the present exemplary embodiment configured as described above. In the aircraft pneumatic tire 10 according to the present exemplary embodiment in FIG. 1, the low elasticity portions 22 are provided at at least one of the cords 32 of the belt protection layer 18 or the cords 32 of the outside belt layer 16, and these cords 32 are more liable to deform locally. Thus stress occurring at the boundary layer between the cords 32 and the rubber is alleviated when the radius increases due to charging internal pressure, or during ground contact. The wave shaped cords 32 of the belt protection layers 18 illustrated in FIG. 5A, FIG. 5B, and FIG. 5C, for example, enable an increase in the tension of the cords 32 when inflating the internal pressure to be suppressed, without increasing the amplitude. There is no need to increase the amount of the cord 32 used in order to secure room for elongation of the cord 32, thereby enabling the durability to be improved without increasing the tire mass.

Since the positions of the low elasticity portions 22 in the cord length direction are different to each other in adjacent cords 32, stress occurring at the boundary layer between the cord 32 and the rubber can be distributed.

Various protrusions (foreign objects) are sometimes present on pavements aircraft run along. As illustrated in FIG. 2, FIG. 5A, FIG. 5B, and FIG. 5C, the low elasticity portions 22 are concentrated in the plural low elasticity regions 50 that are provided at intervals L in the tire circumferential direction, such that the probability of a protrusion being aligned with the position of a low elasticity portion 22 is reduced when a protrusion on the pavement is run over. This enables damage to the tire by the protrusion to be suppressed.

The low elasticity regions 50 are each formed in a belt shape, and extend continuously or intermittently along a direction parallel to the tire width direction, or obliquely to the tire width direction. This enables stress occurring at the boundary layer between the cords 32 and the rubber during ground contact to be distributed along the extension direction of the low elasticity regions 50.

Forming the holes 20 in the cords 32 enables the low elasticity portions 22 to be easily provided at desired positions of the cords 32. Setting the size of each hole 20 as less than the diameter of the cord 32 suppresses severing of the cord configuration elements 30, and enabling the breaking strength of the cord 32 to be secured. Setting the size of each hole 20 as half the diameter of each cord configuration element 30 or greater enables the elasticity of the cord configuration elements 30 to be lowered as appropriate.

Other Exemplary Embodiments

The belt protection layer 18 is not limited to the wave shapes illustrated in FIG. 5A, FIG. 5B, and FIG. 5C, and may have the split belt configuration illustrated in FIG. 2A and FIG. 2B.

The positions of the low elasticity portions 22 in the cord length direction are set different to each other in adjacent cords 32; however, configuration is not limited thereto, and the positions of the low elasticity portions 22 may be the same as each other.

Plural low elasticity regions 50 are provided at intervals L in the tire circumferential direction; however, configuration is not limited thereto, and the low elasticity region 50 may be provided at one location in the tire circumferential direction.

The low elasticity regions 50 are each formed in a belt shape, and extend continuously or intermittently in a direction parallel to the tire width direction, or obliquely to the tire width direction; however the shape and placement of the low elasticity regions 50 is not limited thereto. There is no limitation to forming the low elasticity regions 50, and the low elasticity portions 22 may be distributed in the tire circumferential direction without being concentrated.

Each of the low elasticity portions 22 is configured by forming the hole 20 in the diameter direction of the cord 32; however, configuration is not limited thereto, and a cutout may be formed in the cord 32 by machining, shrinking along the diameter direction, or the like, and the diameter of the cord 32 may be made smaller locally. The mechanical method described above is effective as a method of providing the low elasticity portions 22; however, the method is not limited thereto, and a non-contact method such as laser irradiation or heat treatment may be employed.

The size of each hole 20 is less than the diameter of the cord 32, and half the diameter of each cord configuration element or greater; however, the size of the hole 20 is not necessarily limited thereto.

The entire disclosure of Japanese Patent Application 2013-118232 filed on Jun. 4, 2013 is incorporated in the present specification by reference.

All publications, patent applications and technical standards mentioned in the present specification are incorporated by reference in the present specification to the same extent as if the individual publication, patent application, or technical standard was specifically and individually indicated to be incorporated by reference.

Explanation of the Reference Numerals 10 aircraft pneumatic tire
12 carcass ply
14 inside belt layer
16 outside belt layer
18 belt protection layer
20 hole
22 low elasticity portion
24 bead portion
26 outside belt layer
30 cord configuration element
32 cord
50 low elasticity region

The invention claimed is:

1. An aircraft pneumatic tire, comprising:
a carcass ply that straddles between a pair of bead portions;
an inside belt layer that is provided at a tire radial direction outer side of a crown portion of the carcass ply;
an outside belt layer that is provided at a tire radial direction outer side of the inside belt layer and that is configured by a cord of cord configuration elements that have been twisted together;
a belt protection layer that is provided at a tire radial direction outer side of the outside belt layer and that is configured by a cord of cord configuration elements that have been twisted together; and
a low elasticity portion that is provided at at least one of the cord of the belt protection layer or the cord of the outside belt layer, and that has a lower elasticity than other length direction portions of the cord; wherein
the low elasticity portion is configured as a hole that is formed from an outermost surface side of the cord in a diameter direction of the cord toward an inner region of the cord; and wherein
at least one of the belt protection layer or the outside belt layer is provided with low elasticity regions at which the low elasticity portions are concentrated;
the low elasticity regions are provided with an interval L therebetween in a tire circumferential direction;
the low elasticity portions are not provided between the low elasticity regions adjacent to each other in the tire circumferential direction; and
L/LL>0.3, where LL is a ground contact length of a tread in the tire circumferential direction.

2. The aircraft pneumatic tire of claim 1, wherein the position of the low elasticity portion in a cord length direction differs in adjacent cords.

3. The aircraft pneumatic tire of claim 1, wherein the size of the hole is less than the diameter of the cord.

4. The aircraft pneumatic tire of claim 1, wherein the size of the hole is half the diameter of the cord configuration elements, or greater.

* * * * *